United States Patent
Yang et al.

(10) Patent No.: US 11,753,488 B1
(45) Date of Patent: Sep. 12, 2023

(54) PROCESSES FOR PREPARING METALLOCENE-BASED CATALYST SYSTEMS WITH AN ALCOHOL COMPOUND

(71) Applicant: Chevron Phillips Chemical Company LP, The Woodlands, TX (US)

(72) Inventors: Qing Yang, Bartlesville, OK (US); Ryan N. Rose, Caney, KS (US); Max P. McDaniel, Bartlesville, OK (US); Zhihui Gu, Bellarie, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 17/848,478

(22) Filed: Jun. 24, 2022

(51) Int. Cl.
  C08F 4/642 (2006.01)
  C08F 4/6592 (2006.01)
  C08F 10/00 (2006.01)
  C08F 110/02 (2006.01)
  C08F 210/16 (2006.01)
  C08F 4/52 (2006.01)
  C08F 4/02 (2006.01)

(52) U.S. Cl.
  CPC ............ *C08F 110/02* (2013.01); *C08F 4/025* (2013.01); *C08F 4/52* (2013.01); *C08F 4/642* (2013.01); *C08F 210/16* (2013.01); *C08F 2410/07* (2021.01); *C08F 2420/00* (2013.01)

(58) Field of Classification Search
  CPC ............... C08F 4/6592; C08F 4/65925; C08F 4/65927; C08F 4/65912
  See application file for complete search history.

(56) References Cited

U.S. PATENT DOCUMENTS

| | | | |
|---|---|---|---|
| 3,248,179 A | 4/1966 | Norwood |
| 4,501,885 A | 2/1985 | Sherk |
| 4,588,790 A | 5/1986 | Jenkins, III |
| 5,352,749 A | 10/1994 | Dechellis |
| 5,436,304 A | 7/1995 | Griffin |
| 5,565,175 A | 10/1996 | Hottovy |
| 5,575,979 A | 11/1996 | Hanson |
| 6,107,230 A | 8/2000 | Mcdaniel |
| 6,165,929 A | 12/2000 | Mcdaniel |
| 6,239,235 B1 | 5/2001 | Hottovy |
| 6,262,191 B1 | 7/2001 | Hottovy |
| 6,294,494 B1 | 9/2001 | Mcdaniel |
| 6,300,271 B1 | 10/2001 | Mcdaniel |
| 6,316,553 B1 | 11/2001 | Mcdaniel |
| 6,355,594 B1 | 3/2002 | Mcdaniel |
| 6,376,415 B1 | 4/2002 | Mcdaniel |
| 6,388,017 B1 | 5/2002 | Mcdaniel |
| 6,391,816 B1 | 5/2002 | Mcdaniel |
| 6,395,666 B1 | 5/2002 | Mcdaniel |
| 6,524,987 B1 | 2/2003 | Collins |
| 6,548,441 B1 | 4/2003 | Mcdaniel |
| 6,548,442 B1 | 4/2003 | Mcdaniel |
| 6,576,583 B1 | 6/2003 | Mcdaniel |
| 6,613,712 B1 | 9/2003 | Mcdaniel |
| 6,632,894 B1 | 10/2003 | Mcdaniel |
| 6,667,274 B1 | 12/2003 | Hawley |
| 6,750,302 B1 | 6/2004 | Mcdaniel |
| 6,833,415 B2 | 12/2004 | Kendrick |
| 7,026,494 B1 | 4/2006 | Yang |
| 7,041,617 B2 | 5/2006 | Jensen |
| 7,199,073 B2 | 4/2007 | Martin |
| 7,226,886 B2 | 6/2007 | Jayaratne |
| 7,294,599 B2 | 11/2007 | Jensen |
| 7,312,283 B2 | 12/2007 | Martin |
| 7,517,939 B2 | 4/2009 | Yang |
| 7,531,606 B2 | 5/2009 | Hendrickson |
| 7,598,327 B2 | 10/2009 | Shaw |
| 7,601,665 B2 | 10/2009 | Mcdaniel |
| 7,619,047 B2 | 11/2009 | Yang |
| 7,884,163 B2 | 2/2011 | Mcdaniel |
| 7,919,639 B2 | 4/2011 | Murray |
| 8,080,681 B2 | 12/2011 | Murray |
| 8,309,485 B2 | 11/2012 | Yang |
| 8,822,608 B1 | 9/2014 | Bhandarkar |
| 9,303,099 B2 | 4/2016 | Yang |
| 9,718,907 B2 | 8/2017 | Ding |

FOREIGN PATENT DOCUMENTS

WO  1993007189 A1  4/1993

OTHER PUBLICATIONS

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.
Hieber, C. A., et al., "Shear-rate-dependence modeling of polymer melt viscosity," Polymer Engineering and Science, Jul. 1992, pp. 931-938, vol. 32, No. 14.
Hieber, C. A., et al., "Some correlations involving the shear viscosity of polystyrene melts," Rheol Acta, 1989, pp. 321-332, vol. 28.
IUPAC Compendium of Chemical Terminology, 2nd Ed. 1997, pp. 1-1670.

*Primary Examiner* — Caixia Lu
(74) *Attorney, Agent, or Firm* — Merchant & Gould P.C.

(57) ABSTRACT

Methods for preparing metallocene-based catalyst compositions include the steps of contacting an alcohol compound and an organoaluminum compound for a first period of time to form a precontacted mixture, and contacting the precontacted mixture with an activator-support and a metallocene compound for a second period of time to form the catalyst composition. Such catalyst compositions can contain an activator-support, a metallocene compound, an organoaluminum compound, and a dialkyl aluminum alkoxide, and these catalyst compositions have increased catalytic activity for the polymerization of olefins.

23 Claims, No Drawings

PROCESSES FOR PREPARING METALLOCENE-BASED CATALYST SYSTEMS WITH AN ALCOHOL COMPOUND

FIELD OF THE INVENTION

The present disclosure concerns metallocene-based catalyst systems, and more particularly, relates to the use of an alcohol compound during preparation of the metallocene-based catalyst systems.

BACKGROUND OF THE INVENTION

There are various methods used to prepare metallocene-based catalyst systems containing an activator-support and an organoaluminum compound. These catalyst systems can be used to polymerize olefins to produce olefin-based polymers, such as ethylene/α-olefin copolymers. Using the same metallocene, activator-support, and organoaluminum components of the catalyst system, it would be beneficial for these catalyst systems to have higher catalytic activities for the production of olefin-based polymers. Accordingly, it is to this end that the present disclosure is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to new catalyst compositions, methods for preparing catalyst compositions, methods for using the catalyst compositions to polymerize olefins, the polymer resins produced using such catalyst compositions, and articles produced using these polymer resins. In particular, the present invention relates to methods for preparing metallocene-based catalyst compositions, and to the resultant catalyst compositions. Catalyst compositions of the present invention can be used to produce, for example, ethylene-based homopolymers and copolymers.

Various processes related to the preparation of metallocene-based catalyst compositions are disclosed herein. In one aspect, a process for producing a catalyst composition is provided, and in this aspect, the process can comprise (i) contacting an alcohol compound and an organoaluminum compound for a first period of time to form a precontacted mixture, and (ii) contacting the precontacted mixture with an activator-support and a metallocene compound for a second period of time to form the catalyst composition. While not wishing to be bound by the following theory, it is believed that the metallocene-based catalyst composition, prepared as described herein, can have an unexpected increase in catalytic activity.

Catalyst compositions also are encompassed by the present invention. In one aspect, the catalyst composition can comprise (A) an activator-support, (B) a metallocene compound, (C) an organoaluminum compound, and (D) a dialkyl aluminum alkoxide. Optionally, the catalyst composition can further comprise an alkyl aluminum dialkoxide and/or an aluminum trialkoxide.

The present invention also contemplates and encompasses olefin polymerization processes. Such processes can comprise contacting a catalyst composition with an olefin monomer and optionally an olefin comonomer in a polymerization reactor system under polymerization conditions to produce an olefin polymer. Generally, the catalyst composition employed can comprise any of the metallocene-based catalyst systems disclosed herein or a metallocene-based catalyst system prepared by any of the processes disclosed herein.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the compositions and processes described herein are contemplated with or without explicit description of the particular combination. Additionally, unless explicitly recited otherwise, any aspect and/or feature disclosed herein can be combined to describe inventive features consistent with the present disclosure.

In this disclosure, while compositions and processes are often described in terms of "comprising" various components or steps, the compositions and processes also can "consist essentially of" or "consist of" the various components or steps, unless stated otherwise.

The terms "a," "an," and "the" are intended to include plural alternatives, e.g., at least one. For instance, the disclosure of "an activator-support" and "a metallocene compound" is meant to encompass one, or mixtures or combinations of more than one, activator-support and metallocene compound, respectively, unless otherwise specified.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For instance, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

The term "polymer" is used herein generically to include olefin homopolymers, copolymers, terpolymers, and the like, as well as alloys and blends thereof. The term "polymer" also includes impact, block, graft, random, and alternating copolymers. A copolymer can be derived from an olefin monomer and one olefin comonomer, while a terpolymer can be derived from an olefin monomer and two olefin comonomers. Accordingly, "polymer" encompasses copolymers and terpolymers. Similarly, the scope of the term "polymerization" includes homopolymerization, copolymerization, and terpolymerization. Therefore, an ethylene polymer includes ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an ethylene copolymer can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, if present and unless stated otherwise, and such configurations can include isotactic, syndiotactic, and random symmetries. The term "polymer" also is meant to include all molecular weight polymers.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the alcohol compound(s), the organoaluminum compound(s), the metallocene compound(s), or the activator-support(s), after combining these components. Therefore, the terms "catalyst composition," "catalyst mixture," "catalyst system," and the like, can encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, are used interchangeably throughout this disclosure.

The term "contacting" is used herein to describe compositions and processes in which the components are contacted or combined together in any order, in any manner, and for any length of time, unless otherwise specified. For example, the components can be combined by blending or mixing, or by using any suitable technique. Contacting or combining two or more components can form a reaction product or a reaction mixture.

A "precontacted mixture" describes a mixture of catalyst components that are combined or contacted for a period of time prior to being contacted with other catalyst components. According to this description, it is possible for the components of the precontacted mixture, once contacted, to have reacted to form at least one chemical compound, formulation, species, or structure different from the distinct initial compounds or components used to prepare the precontacted mixture.

The term "hydrocarbon" refers to a compound containing only carbon and hydrogen. The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

Various numerical ranges are disclosed herein. When a range of any type is disclosed or claimed, the intent is to disclose or claim individually each possible number that such a range could reasonably encompass, including end points of the range as well as any sub-ranges and combinations of sub-ranges encompassed therein, unless otherwise specified. As a representative example, the present disclosure recites that the weight ratio of the metallocene compound to the activator-support in a catalyst composition can be in certain ranges. By a disclosure that the weight ratio can be in a range from 1:1 to 1:1,000,000, the intent is to recite that the weight ratio can be any ratio in the range and, for example, can include any range or combination of ranges from 1:1 to 1:1,000,000, such as from 1:10 to 1:10,000, from 1:20 to 1:1000, or from 1:50 to 1:500, and so forth. Likewise, all other ranges disclosed herein should be interpreted in a manner similar to this example.

In general, an amount, size, formulation, parameter, range, or other quantity or characteristic is "about" or "approximate" whether or not expressly stated to be such. Whether or not modified by the term "about" or "approximately," the claims include equivalents to the quantities or characteristics.

Although any methods, devices, and materials similar or equivalent to those described herein can be used in the practice or testing of the invention, the typical methods, devices, and materials are herein described.

All publications and patents mentioned herein are incorporated herein by reference in their entirety for the purpose of describing and disclosing, for example, the constructs and methodologies that are described in the publications and patents, which might be used in connection with the presently described invention.

DETAILED DESCRIPTION OF THE INVENTION

Disclosed herein are methods for preparing metallocene-based catalyst compositions using a metallocene compound, an activator-support, an organoaluminum compound, and a controlled amount of an alcohol compound. Polymerization processes utilizing these catalyst compositions also are disclosed.

Alcohol compounds are normally poisons which can deactivate metallocene-based catalyst systems and, therefore, are avoided. However, by using a controlled amount of the alcohol compound, the methods and catalyst compositions disclosed herein exhibit an unexpected increase in catalytic activity.

Processes for Preparing Catalyst Compositions

Various processes for preparing a catalyst composition containing a metallocene compound, an activator-support, and an organoaluminum compound are disclosed and described. One or more than one metallocene compound, one or more than one activator-support, and one or more than organoaluminum compound can be employed in the disclosed processes and compositions. A process for producing a catalyst composition consistent with aspects of this invention can comprise (or consist essentially of, or consist of):

(i) contacting an alcohol compound and an organoaluminum compound for a first period of time to form a precontacted mixture (alternatively, and equivalently, a first mixture); and (ii) contacting the precontacted mixture with an activator-support and a metallocene compound for a second period of time to form the catalyst composition.

Generally, the features of any of the processes disclosed herein (e.g., the activator-support, the organoaluminum compound, the metallocene compound, the alcohol compound, the first period of time, and the second period of time, among others) are independently described herein, and these features can be combined in any combination to further describe the disclosed processes. Moreover, other process steps can be conducted before, during, and/or after any of the steps listed in the disclosed processes, unless stated otherwise. Additionally, catalyst compositions produced in accordance with the disclosed processes are within the scope of this disclosure and are encompassed herein.

In step (i), there is a molar excess of the organoaluminum compound(s), as compared to the alcohol compound(s). As one of skill in the art would readily recognize, an excess of the alcohol compound, as compared to certain components of the catalyst system, can drastically reduce the catalyst activity and polymer production rate and, eventually, can "kill" the reaction. Thus, the practical maximum amount of the alcohol compound added to the catalyst system is limited. Typically, the molar ratio of hydroxyl (—OH) groups of the alcohol compound to aluminum of the organoaluminum compound (OH:Al) falls within a range from 0.05:1 to 0.9:1. Representative and non-limiting ranges include, for instance, a molar ratio of OH:Al from 0.05:1 to 0.7:1, from 0.05:1 to 0.5:1, 0.07:1 to 0.65:1, from 0.1:1 to 0.8:1, from 0.1:1 to 0.7:1, or from 0.2:1 to 0.6:1, and the like.

While not being limited thereto, the molar ratio of the alcohol compound (prior to the formation of the precontacted mixture in step (i)) to the metallocene compound(s) (prior to formation of the catalyst composition in step (ii)) often can range from as low as 1:1 and up to and including 1000:1. In one aspect, the molar ratio of the alcohol compound to the metallocene compound can range from 10:1 to 500:1, while in another aspect, the molar ratio can range from 50:1 to 750:1, and in yet another aspect, the molar ratio can range from 100:1 to 400:1.

Likewise, and also not being limited thereto, the weight ratio of the alcohol compound (prior to the formation of the precontacted mixture in step (i)) to the activator-support(s) (prior to formation of the catalyst composition in step (ii)) often can range from 1:1 to 1:500. In one aspect, the weight ratio of the alcohol compound to the activator-support can range from 1:2 to 1:250, while in another aspect, the weight ratio can range from 1:5 to 1:150, and in yet another aspect, the weight ratio can range from 1:10 to 1:100.

Step (i) of the process often can be referred to as the precontacting step, and in the precontacting step, an alcohol compound is contacted with an organoaluminum compound for a first period of time to form a precontacted mixture. The precontacting step can be conducted at a variety of temperatures and time periods. For instance, the precontacting step can be conducted at a precontacting temperature in a range from 0° C. to 100° C.; alternatively, from 0° C. to 75° C.; alternatively, from 10° C. to 75° C.; alternatively, from 20° C. to 60° C.; alternatively, from 20° C. to 50° C.; alternatively, from 15° C. to 45° C.; or alternatively, from 20° C. to 40° C. In these and other aspects, these temperature ranges also are meant to encompass circumstances where the precontacting step is conducted at a series of different temperatures, instead of at a single fixed temperature, falling within the respective ranges, wherein at least one temperature falls within the respective ranges.

The duration of the precontacting step (the first period of time) is not limited to any particular period of time, so long as the first period of time is sufficient for any reaction between the alcohol compound and the organoaluminum compound to occur, thus forming the precontacted mixture. Hence, the first period of time can be, for example, in a time period ranging from as little as 1-10 seconds to as long as 48 hours, or more. The appropriate first period of time can depend upon, for example, the precontacting temperature, the amounts of the alcohol compound and the organoaluminum compound in the precontacted mixture, the presence of diluents or solvents in the precontacting step, and the degree of mixing, among other variables. Generally, however, the first period of time can be at least 5 sec, at least 15 sec, at least 30 sec, at least 1 min, at least 5 min, at least 10 min, and so forth. Typical ranges for the first period of time can include, but are not limited to, from 1 sec to 15 sec, from 1 sec to 10 min, from 1 sec to 48 hr, from 10 sec to 12 hr, from 30 sec to 24 hr, from 30 sec to 6 hr, from 30 sec to 5 min, from 1 min to 12 hr, from 5 min to 24 hr, or from 10 min to 8 hr, as well as ranges within these exemplary ranges.

Often, the precontacting step can be conducted by combining (e.g., mixing) the alcohol compound with a solution of the organoaluminum compound in any suitable hydrocarbon solvent. The alcohol compound can be used neat, or it also can be diluted in any suitable hydrocarbon solvent, which can be the same as or different from that used with the organoaluminum compound.

In step (ii) of the process, the precontacted mixture (often, a solution) can be contacted with an activator-support and a metallocene compound for a second period of time to form the catalyst composition. Step (ii), likewise, can be conducted at a variety of temperatures and time periods. For instance, step (ii) can be conducted at a temperature in a range from 0° C. to 100° C.; alternatively, from 10° C. to 75° C.; alternatively, from 20° C. to 60° C.; alternatively, from 15° C. to 45° C.; or alternatively, from 20° C. to 40° C. In these and other aspects, these temperature ranges are also meant to encompass circumstances where step (ii) is conducted at a series of different temperatures, instead of at a single fixed temperature, falling within the respective ranges, wherein at least one temperature falls within the respective ranges. As an example, the precontacted mixture and the activator-support and the metallocene compound can be contacted at an elevated temperature, following by cooling to a lower temperature for longer term storage of the finished catalyst composition.

The second period of time is not limited to any particular period of time. Hence, the second period of time can range from as little as 1-10 seconds to as long as 48 hours, or more. The appropriate second period of time can depend upon, for example, the temperature, the amounts of the precontacted mixture and the activator-support and the metallocene compound, the presence of diluents or solvents in step (ii), the degree of mixing, and considerations for long term storage, among other variables. Generally, however, the second period of time can be at least 5 sec, at least 15 sec, at least 30 sec, at least 1 min, at least 5 min, at least 10 min, and so forth. Assuming the catalyst composition is not intended for long term storage, which could extend for days or weeks, typical ranges for the second period of time can include, but are not limited to, from 1 sec to 15 sec, from 1 sec to 10 min, from 1 sec to 48 hr, from 10 sec to 12 hr, from 30 sec to 24 hr, from 30 sec to 6 hr, from 30 sec to 5 min, from 1 min to 6 hr, from 5 min to 24 hr, or from 10 min to 8 hr.

In one aspect, the precontacted mixture is contacted in step (ii) with the activator-support before the metallocene compound, while in another aspect, the precontacted mixture is contacted with the metallocene compound before the activator-support, and in yet another aspect, the precontacted mixture is contacted substantially contemporaneously with the activator-support and the metallocene compound, which in this context, means that the precontacted mixture, the activator-support, and the metallocene compound are contacted together as soon as commercially practicable, such as within 10 min, within 5 min, within 1 min, or within 30 sec, of two of the components being contacted (e.g., the metallocene compound and the activator-support).

Often, step (ii) can be conducted by combining (e.g., mixing) the precontacted mixture with a slurry of the activator-support in any suitable hydrocarbon solvent and a solution of the metallocene compound in any (same or different) suitable hydrocarbon solvent. Alternatively, the activator-support in dry solid form can be combined with the precontacted mixture and the metallocene compound. Generally, any suitable procedure known to those of skill in the art for thoroughly combining the activator-support, the metallocene compound, and the precontacted mixture can be employed.

Non-limiting examples of suitable hydrocarbon solvents that can be used, independently, in step (i) or step (ii) include, but are not limited to, cyclohexane, cyclohexene, isobutane, n-butane, n-pentane, isopentane, neopentane, hexane, 1-hexene, heptane, toluene, and the like, or combinations thereof. For example, the solvent used for the organoaluminum compound can be the same as or different from the solvent used for the activator-support slurry and the same as or different from the solvent used for the metallocene compound.

In a related aspect, a catalyst composition consistent with this invention can comprise (A) an activator-support, (B) a metallocene compound, (C) an organoaluminum compound, and (D) a dialkyl aluminum alkoxide. In a further aspect, the catalyst composition can comprise (A) an activator-support, (B) a metallocene compound, (C) an organoaluminum compound, (D) a dialkyl aluminum alkoxide, and (E) an alkyl aluminum dialkoxide and/or an aluminum trialkoxide.

As it pertains to the organoaluminum compound in the catalyst compositions and methods of their preparation, one or more than one organoaluminum compound can be utilized. Likewise, there can be one or more than one alcohol compound used to react with the organoaluminum compound to form the precontacted mixture (and to form one or more of a dialkyl aluminum alkoxide, an alkyl aluminum dialkoxide, and/or an aluminum trialkoxide).

Referring first to organoaluminum compounds, suitable organoaluminum compounds can have the formula, $(R^Z)_3Al$, wherein each $R^Z$ independently can be an aliphatic group having from 1 to 10 carbon atoms. For example, each $R^Z$ independently can be methyl, ethyl, propyl, butyl, hexyl, or isobutyl. Examples of organoaluminum compounds suitable for use in accordance with the present invention can include, but are not limited to, trialkylaluminum compounds, dialkylaluminum halide compounds, dialkylaluminum hydride compounds, and combinations thereof. Specific non-limiting examples of suitable organoaluminum compounds can include trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum chloride, and the like, or combinations thereof. In one aspect, an organoaluminum compound used in the processes and catalyst systems disclosed herein can comprise (or consist essentially of, or consist of) triethylaluminum (TEA), while in another aspect, an organoaluminum compound used in the processes and catalyst systems disclosed herein can comprise (or consist essentially of, or consist of) triisobutylaluminum (TIBA). Yet, in another aspect, a mixture of TEA and TIBA can be used as the organoaluminum component in the processes described herein (or as the organoaluminum component in the catalyst systems disclosed herein).

Alcohol compounds suitable for use herein can include, for example, mono-ols (monoalcohols), diols, triols, or polyols, as well as combinations thereof. Moreover, suitable alcohol compounds can be linear or branched, and can be a primary alcohol, a secondary alcohol, or a tertiary alcohol. Typically, the alcohol compound can comprise a hydrocarbyl alcohol, although this is not a requirement. For instance, the alcohol compound can comprise an alkyl alcohol, a cycloalkyl alcohol, an aryl alcohol, an arylalkyl alcohol, and the like, as well as combinations thereof.

The number of carbon atoms in the alcohol compound is not particularly limited, although in some aspects, the alcohol compound can comprise a $C_1$ to $C_{32}$ alcohol; alternatively, a $C_1$ to $C_{18}$ alcohol; alternatively, a $C_1$ to $C_{12}$ alcohol; alternatively, a $C_1$ to $C_8$ alcohol; alternatively, a $C_1$ to $C_4$ alcohol; alternatively, a $C_2$ to $C_{12}$ alcohol; or alternatively, a $C_2$ to $C_6$ alcohol. Representative and non-limiting examples of suitable alcohol compounds (e.g., mono-ol compounds) can include the following: methanol, ethanol, propanol (e.g., isopropanol, n-propanol), butanol (e.g., n-butanol, isobutanol), pentanol, hexanol, heptanol, octanol, decanol, hexadecanol, cyclohexanol, phenol, benzyl alcohol, and the like, as well as combinations thereof. In one aspect, the alcohol compound can comprise methanol, ethanol, propanol (e.g., isopropanol, n-propanol), butanol (e.g., n-butanol, isobutanol), pentanol, hexanol, heptanol, octanol, decanol, hexadecanol, and the like, or a combination thereof. In another aspect, the alcohol compound can comprise cyclohexanol, phenol, benzyl alcohol, and the like, or a combination thereof. In yet another aspect, the alcohol compound can comprise methanol, ethanol, propanol (e.g., isopropanol, n-propanol), butanol (e.g., n-butanol, isobutanol), pentanol, hexanol, heptanol, octanol, and the like, or a combination thereof. In still another aspect, the alcohol compound can comprise methanol, ethanol, propanol (e.g., isopropanol, n-propanol), butanol (e.g., n-butanol, isobutanol), and the like, or a combination thereof, or alternatively, ethanol, propanol (e.g., isopropanol, n-propanol), butanol (e.g., n-butanol, isobutanol), and the like, or a combination thereof.

In certain aspects, the alcohol compound can comprise a diol, illustrative examples of which can include, but are not limited to, methanediol, ethylene glycol, propylene glycol, butanediol (e.g., 1,4-butanediol), pentanediol, octanediol, bisphenol A, and the like, as well as any combination thereof. Accordingly, the alcohol compound can comprise ethylene glycol, propylene glycol, or both, in some aspects; alternatively, methanediol; alternatively, ethylene glycol; alternatively, propylene glycol; alternatively, butanediol (e.g., 1,4-butanediol); alternatively, pentanediol; alternatively, octanediol; or alternatively, bisphenol A.

In other aspects, the alcohol compound can comprise a triol, a polyol, or combinations thereof, illustrative examples of which can include, but are not limited to, glycerol, benzenetriol, erythritol, xylitol, mannitol, and the like, as well as combinations thereof. Accordingly, the alcohol compound can comprise glycerol in some aspects; alternatively, benzenetriol; alternatively, erythritol; alternatively, xylitol; or alternatively, mannitol.

Beneficially, the alcohol compound, in certain aspects, can be a liquid (under atmospheric pressure) at a temperature in a range from 20° C. to 400° C.; alternatively, in a range from 20° C. to 100° C.; or alternatively, in a range from 20° C. to 75° C. For convenience, the alcohol compound used herein often comprises (or consists essentially of, or consists of) one or a mixture of two or more of methanol, ethanol, propanol (e.g., isopropanol, n-propanol), and/or butanol (e.g., n-butanol, isobutanol).

The dialkyl aluminum alkoxide, alkyl aluminum dialkoxide, and/or aluminum trialkoxide compounds formed in the precontacted mixture and in the catalyst composition from the contact and reaction of the organoaluminum compound with the alcohol compound can have the following formulas: dialkyl aluminum alkoxide compounds can have formula $(R^Z)_2Al(OR^A)$, alkyl aluminum dialkoxide compounds can have formula $(R^Z)Al(OR^A)_2$, and aluminum trialkoxide compounds can have formula $Al(OR^A)_3$. In these formulas, each $R^Z$ and each $R^A$ independently can be a $C_1$ to $C_{18}$ alkyl group; alternatively, a $C_1$ to $C_{10}$ alkyl group; alternatively, a $C_1$ to $C_6$ alkyl group; or alternatively, a $C_1$ to $C_4$ alkyl group.

As an example, if the organoaluminum compound is TEA and the alcohol compound is ethanol, then a typical dialkyl aluminum alkoxide compound formed therefrom is diethylaluminum ethoxide. Further, a typical alkyl aluminum dialkoxide compound that may be formed therefrom is ethylaluminum diethoxide and a typical aluminum trialkoxide compound that may be formed therefrom is aluminum triethoxide.

Unexpectedly, these catalyst compositions and methods of their preparation can result in improvements in catalytic activity. For instance, the activity of the catalyst composition can be greater (e.g., by at least 10%, at least 15%, at least 20%, at least 30%, or at least 35%, and often up to 50%, 60%, 75%, or 100%) than that of an otherwise identical catalyst system obtained without the alcohol compound (or without the dialkyl aluminum alkoxide and without the alkyl aluminum dialkoxide and/or aluminum trialkoxide, if present), under the same catalyst preparation and polymerization conditions. The same polymerization conditions refer to slurry polymerization conditions, using isobutane as a diluent, and with a polymerization temperature of 80° C. and a reactor pressure of 320 psig. Moreover, all components used to prepare the catalyst systems are held constant (e.g., same amount/type of metallocene compound, same amount/type of organoaluminum, same amount/type of activator-support, such as fluorided silica-coated alumina or sulfated alumina) and all polymerization conditions are held constant (e.g., same polymerization temperature and same polymerization pressure). Hence, the only difference is the method used to produce the catalyst system, i.e., the use of an alcohol compound to contact/react with the organoaluminum compound to form a precontacted mixture as part of the catalyst composition.

Generally, in the catalyst compositions and methods of their preparation disclosed herein, the weight ratio of activator-support(s) to organoaluminum compound(s) can be in a range from 1:2 to 500:1, or from 1:2 to 200:1. If more than one organoaluminum compound and/or more than one activator-support are employed, this ratio is based on the total weight of each respective component. In an aspect, the weight ratio of the activator-support to the organoaluminum compound can be in a range from 1:1 to 100:1, from 1:1 to 50:1, or from 2:1 to 20:1.

Likewise, the weight ratio of metallocene compound(s) to activator-support(s) can be in a range from 1:1 to 1:1,000,000, or from 1:10 to 1:10,000. If more than one metallocene compound and/or more than one activator-support are employed, this ratio is based on the total weight of each respective component. In an aspect, the weight ratio of metallocene compound to activator-support can be in a range from 1:20 to 1:1000, or from 1:50 to 1:500, and the like.

In some aspects, the catalyst compositions and methods of their preparation are substantially free of aluminoxane compounds, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. For instance, the catalyst composition can contain less than 500 ppm, less than 100 ppm, less than 10 ppm, or less than 1 ppm (by weight), independently, of aluminoxanes, organoboron or organoborate compounds, and ionizing ionic compounds. In these aspects, the catalyst composition has catalyst activity, as discussed herein, in the absence of these additional materials. For example, a catalyst composition of the present invention can consist essentially of an activator-support, a metallocene compound, an organoaluminum compound, a dialkyl aluminum alkoxide, and an alkyl aluminum dialkoxide and/or an aluminum trialkoxide, wherein no other materials are present in the catalyst composition which would increase/decrease the activity of the catalyst composition by more than about 10% from the catalyst activity of the catalyst composition in the absence of said materials.

Metallocene Compounds

Metallocene-based catalyst compositions consistent with this invention can contain a bridged metallocene compound and/or an unbridged metallocene compound. Metallocene-based catalyst compositions consistent with this invention can also contain two or more bridged metallocene compounds and/or two or more unbridged metallocene compounds. The metallocene compound can comprise, for example, a transition metal (one or more than one) from Groups IIIB-VIIIB of the Periodic Table of the Elements. In one aspect, the metallocene compound can comprise a Group III, IV, V, or VI transition metal, or a combination of two or more transition metals. The metallocene compound can comprise chromium, titanium, zirconium, hafnium, vanadium, or a combination thereof, or can comprise titanium, zirconium, hafnium, or a combination thereof, in other aspects. In further aspects, the metallocene compound can comprise titanium, or zirconium, or hafnium, either singly or in combination.

In some aspects of this invention, the metallocene compound can comprise a bridged metallocene compound, e.g., with titanium, zirconium, or hafnium, such as a bridged zirconium or hafnium based metallocene compound with a fluorenyl group, and with no aryl groups on the bridging group, or a bridged zirconium or hafnium based metallocene compound with a cyclopentadienyl group and a fluorenyl group, and with no aryl groups on the bridging group. Such bridged metallocenes, in some aspects, can contain an alkenyl substituent (e.g., a terminal alkenyl) on the bridging group and/or on a cyclopentadienyl-type group (e.g., a cyclopentadienyl group or a fluorenyl group). In another aspect, the metallocene compound can comprise a bridged zirconium or hafnium based metallocene compound with a fluorenyl group, and an aryl group on the bridging group; alternatively, a bridged zirconium or hafnium based metallocene compound with a cyclopentadienyl group and fluorenyl group, and an aryl group on the bridging group; alternatively, a bridged zirconium based metallocene compound with a fluorenyl group, and an aryl group on the bridging group; or alternatively, a bridged hafnium based metallocene compound with a fluorenyl group, and an aryl group on the bridging group. In these and other aspects, the aryl group on the bridging group can be a phenyl group. Optionally, these bridged metallocenes can contain an alkenyl substituent (e.g., a terminal alkenyl) on the bridging group and/or on a cyclopentadienyl-type group.

In some aspects, the metallocene compound can comprise a bridged zirconium or hafnium based metallocene compound with two indenyl groups (e.g., a bis-indenyl metallocene compound). Hence, the metallocene compound can comprise a bridged zirconium based metallocene compound with two indenyl groups, or alternatively, a bridged hafnium based metallocene compound with two indenyl groups. In some aspects, an aryl group can be present on the bridging group, while in other aspects, there are no aryl groups present on the bridging group. Optionally, these bridged indenyl metallocenes can contain an alkenyl substituent (e.g., a terminal alkenyl) on the bridging group and/or on the indenyl group (one or both indenyl groups). The bridging atom of the bridging group can be, for instance, a carbon atom or a silicon atom; alternatively, the bridge can contain a chain of two carbon atoms, a chain of two silicon atoms, and so forth.

Illustrative and non-limiting examples of bridged metallocene compounds (e.g., with zirconium or hafnium) that can be employed in catalyst systems consistent with aspects of the present invention are described in U.S. Pat. Nos. 7,026,494, 7,041,617, 7,226,886, 7,312,283, 7,517,939, and 7,619,047.

In some aspects of this invention, the metallocene compound can comprise an unbridged metallocene; alternatively, an unbridged zirconium or hafnium based metallocene compound and/or an unbridged zirconium and/or hafnium based dinuclear metallocene compound; alternatively, an unbridged zirconium or hafnium based metallocene compound containing two cyclopentadienyl groups, two indenyl groups, or a cyclopentadienyl and an indenyl group; alternatively, an unbridged zirconium based metallocene compound containing two cyclopentadienyl groups, two indenyl groups, or a cyclopentadienyl and an indenyl group. Illustrative and non-limiting examples of unbridged metallocene compounds (e.g., with zirconium or hafnium) that can be employed in catalyst systems consistent with aspects of the present invention are described in U.S. Pat. Nos. 7,199,073, 7,226,886, 7,312,283, and 7,619,047.

Moreover, the metallocene compound can comprise an unbridged dinuclear metallocene such as those described in U.S. Pat. Nos. 7,919,639 and 8,080,681. The metallocene compound can comprise an unbridged zirconium and/or hafnium based dinuclear metallocene compound. For example, the metallocene compound can comprise an unbridged zirconium based homodinuclear metallocene compound, or an unbridged hafnium based homodinuclear metallocene compound, or an unbridged zirconium and/or hafnium based heterodinuclear metallocene compound (i.e., a dinuclear compound with two hafniums, or two zirconiums, or one zirconium and one hafnium).

Aspects of this invention also are directed to catalyst compositions and methods of preparing catalyst compositions in which two or more metallocene compounds are employed, e.g., a dual metallocene catalyst composition. Independently, each respective metallocene compound can be any bridged metallocene compound disclosed herein or any unbridged metallocene compound disclosed herein.

Thus, in certain aspects of this invention, the catalyst composition and the method of preparing the catalyst composition can comprise more than one metallocene compound, for example, one bridged metallocene compound and one unbridged metallocene compound, or two or more bridged metallocene compounds, or two or more unbridged metallocene compounds. In such instances, the weight ratio of the first metallocene compound to the second metallocene compound generally can be in a range of from 1:100 to 100:1, such as from 1:50 to 50:1, from 1:10 to 10:1, from 1:5 to 5:1, from 1:3 to 3:1, from 1:2 to 2:1, from 1:1.5 to 1.5:1, or from 1:1.2 to 1.2:1, and the like.

Activator-Supports

The present invention encompasses various catalyst compositions containing an activator-support, and various methods of preparing catalyst compositions using an activator-support. In one aspect, the activator-support can comprise a solid oxide treated with an electron-withdrawing anion. Alternatively, in another aspect, the activator-support can comprise a solid oxide treated with an electron-withdrawing anion, the solid oxide containing a Lewis-acidic metal ion. Non-limiting examples of suitable activator-supports are disclosed in, for instance, U.S. Pat. Nos. 7,294,599, 7,601,665, 7,884,163, and 8,309,485.

The solid oxide can encompass oxide materials such as alumina, "mixed oxides" thereof such as silica-alumina, coatings of one oxide on another, and combinations and mixtures thereof. The mixed oxides such as silica-alumina can be single or multiple chemical phases with more than one metal combined with oxygen to form the solid oxide. Examples of mixed oxides that can be used to form an activator-support, either singly or in combination, can include, but are not limited to, silica-alumina, silica-titania, silica-zirconia, alumina-titania, alumina-zirconia, zinc-aluminate, alumina-boria, silica-boria, aluminophosphate-silica, titania-zirconia, and the like. The solid oxide used herein also can encompass oxide materials such as silica-coated alumina, as described in U.S. Pat. No. 7,884,163.

Accordingly, in one aspect, the solid oxide can comprise silica, alumina, silica-alumina, silica-coated alumina, aluminum phosphate, aluminophosphate, heteropolytungstate, titania, silica-titania, zirconia, silica-zirconia, magnesia, boria, zinc oxide, any mixed oxide thereof, or any combination thereof. In another aspect, the solid oxide can comprise alumina, silica-alumina, silica-coated alumina, aluminum phosphate, aluminophosphate, heteropolytungstate, titania, silica-titania, zirconia, silica-zirconia, magnesia, boria, or zinc oxide, as well as any mixed oxide thereof, or any mixture thereof. In another aspect, the solid oxide can comprise silica, alumina, titania, zirconia, magnesia, boria, zinc oxide, any mixed oxide thereof, or any combination thereof. In yet another aspect, the solid oxide can comprise silica-alumina, silica-coated alumina, silica-titania, silica-zirconia, alumina-boria, or any combination thereof. In still another aspect, the solid oxide can comprise alumina, silica-alumina, silica-coated alumina, or any mixture thereof; alternatively, alumina; alternatively, silica-alumina; or alternatively, silica-coated alumina.

The silica-alumina or silica-coated alumina solid oxide materials which can be used can have a silica content from 5% to 95% by weight. In one aspect, the silica content of these solid oxides can be from 10% to 80%, or from 20% to 70%, silica by weight. In another aspect, such materials can have silica contents ranging from 15% to 60%, or from 25% to 50%, silica by weight. The solid oxides contemplated herein can have any suitable surface area, pore volume, and particle size, as would be recognized by those of skill in the art.

The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, tungstate, molybdate, and the like, including mixtures and combinations thereof. In addition, other ionic or non-ionic compounds that serve as sources for these electron-withdrawing anions also can be employed. It is contemplated that the electron-withdrawing anion can be, or can comprise, fluoride, chloride, bromide, phosphate, triflate, bisulfate, or sulfate, and the like, or any combination thereof, in some aspects provided herein. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof. Yet, in other aspects, the electron-withdrawing anion can comprise fluoride and/or sulfate.

The activator-support generally can contain from 1 to 25 wt. % of the electron-withdrawing anion, based on the weight of the activator-support. In particular aspects provided herein, the activator-support can contain from 1 to 20 wt. %, from 2 to 20 wt. %, from 3 to 20 wt. %, from 2 to 15 wt. %, from 3 to 15 wt. %, from 3 to 12 wt. %, or from 4 to 10 wt. %, of the electron-withdrawing anion, based on the total weight of the activator-support.

In an aspect, the activator-support can comprise fluorided alumina, chlorided alumina, bromided alumina, sulfated alumina, phosphated alumina, fluorided silica-alumina, chlorided silica-alumina, bromided silica-alumina, sulfated silica-alumina, phosphated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, and the like, as well as any mixture or combination thereof. In another aspect, the activator-support employed in the processes and catalyst systems described herein can be, or can comprise, a fluorided solid oxide and/or a sulfated solid oxide and/or a phosphated solid oxide, non-limiting examples of which can include fluorided alumina, sulfated alumina, phosphated alumina, fluorided silica-alumina, sulfated silica-alumina, phosphated silica-alumina, fluorided silica-zirconia, fluorided silica-coated alumina, fluorided-chlorided silica-coated alumina, sulfated silica-coated alumina, phosphated silica-coated alumina, and the like, as well as combinations thereof. In yet another aspect, the activator-support can comprise fluorided alumina; alternatively, chlorided alumina; alternatively, sulfated alumina; alternatively, phosphated alumina; alternatively, fluorided silica-alumina; alternatively, sulfated silica-alumina; alternatively, phosphated silica-alumina; alternatively, fluorided silica-zirconia; alternatively, chlorided silica-zirconia; alternatively, sulfated silica-coated alumina; alternatively, phosphated silica-coated alumina; alternatively, fluorided-chlorided silica-coated alumina; or alternatively, fluorided silica-coated alumina.

Various processes can be used to form activator-supports useful in the present invention. Methods of contacting the solid oxide with the electron-withdrawing component, suitable electron withdrawing components and addition amounts, impregnation with metals or metal ions (e.g., zinc, nickel, vanadium, titanium, silver, copper, gallium, tin, tungsten, molybdenum, zirconium, and the like, or combinations thereof), and various calcining procedures and conditions are disclosed in, for example, U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485. Other suitable processes and procedures for preparing activator-supports (e.g., fluorided solid oxides, sulfated solid oxides, or phosphated solid oxides) are well known to those of skill in the art.

Olefin Monomers and Olefin Polymers

Olefin monomers contemplated herein typically include olefin compounds having from 2 to 30 carbon atoms per molecule and having at least one olefinic double bond. Homopolymerization processes using a single olefin, such as ethylene, propylene, butene, hexene, octene, and the like, are encompassed, as well as copolymerization and terpolymerization, reactions using an olefin monomer with at least one different olefinic compound. For example, resultant ethylene copolymers, or terpolymers, generally can contain a major amount of ethylene (>50 mole percent) and a minor amount of comonomer (<50 mole percent), though this is not a requirement. Comonomers that can be copolymerized with ethylene often can have from 3 to 20 carbon atoms, or from 3 to 10 carbon atoms, in their molecular chain.

Acyclic, cyclic, polycyclic, terminal ($\alpha$), internal, linear, branched, substituted, unsubstituted, functionalized, and non-functionalized olefins can be employed. For example, typical unsaturated compounds that can be polymerized to produce olefin polymers can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene also can be employed as a monomer or as a comonomer. In an aspect, the olefin monomer can comprise a $C_2$-$C_{20}$ $\alpha$-olefin; alternatively, a $C_2$-$C_{20}$ $\alpha$-olefin; alternatively, a $C_2$-$C_{12}$ olefin; alternatively, a $C_2$-$C_{10}$ $\alpha$-olefin; alternatively, ethylene, propylene, 1-butene, 1-hexene, or 1-octene; alternatively, ethylene or propylene; alternatively, ethylene; or alternatively, propylene.

When a copolymer (or alternatively, a terpolymer) is desired, the olefin monomer can be, for example, ethylene or propylene, which is copolymerized with at least one comonomer (e.g., a $C_2$-$C_{20}$ $\alpha$-olefin, a $C_3$-$C_{20}$ $\alpha$-olefin). According to one aspect, the olefin monomer in the polymerization process can be ethylene. In this aspect, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another aspect, the comonomer can comprise an $\alpha$-olefin (e.g., a $C_3$-$C_{10}$ $\alpha$-olefin), while in yet another aspect, the comonomer can comprise 1-butene, 1-pentene, 1-hexene, 1-octene, 1-decene, styrene, or any combination thereof. For example, the comonomer can comprise 1-butene, 1-hexene, 1-octene, or a combination thereof.

Generally, the amount of comonomer introduced into a polymerization reactor to produce the copolymer can be from 0.01 to 50 weight percent of the comonomer based on the total weight of the monomer and comonomer. According to another aspect, the amount of comonomer introduced into a polymerization reactor can be from 0.01 to 40 weight percent comonomer based on the total weight of the monomer and comonomer. In still another aspect, the amount of comonomer introduced into a polymerization reactor can be from 0.1 to 35 weight percent comonomer based on the total weight of the monomer and comonomer. Yet, in another aspect, the amount of comonomer introduced into a polymerization reactor can be from 0.5 to 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization reaction. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one aspect, at least one monomer/reactant can be ethylene (or propylene), so the polymerization reaction can be a homopolymerization involving only ethylene (or propylene), or a copolymerization with a different acyclic, cyclic, terminal, internal, linear, branched, substituted, or unsubstituted olefin. In addition, the methods disclosed herein intend for olefin to also encompass diolefin compounds that include, but are not limited to, 1,3-butadiene, isoprene, 1,4-pentadiene, 1,5-hexadiene, and the like.

Olefin polymers encompassed herein can include any polymer produced from any olefin monomer (and optional comonomer(s)) described herein. For example, the olefin polymer can comprise an ethylene homopolymer, a propylene homopolymer, an ethylene copolymer (e.g., ethylene/α-olefin, ethylene/1-butene, ethylene/1-hexene, or ethylene/1-octene), a propylene copolymer, an ethylene terpolymer, a propylene terpolymer, and the like, including combinations thereof. In one aspect, the olefin polymer can be (or can comprise) an ethylene homopolymer, an ethylene/1-butene copolymer, an ethylene/1-hexene copolymer, or an ethylene/1-octene copolymer, or a combination thereof or alternatively, an ethylene/1-hexene copolymer. In another aspect, the olefin polymer can be (or can comprise) a polypropylene homopolymer and/or a propylene-based copolymer. In some aspects, the olefin polymer can have a bimodal molecular weight distribution, while in other aspects, the olefin polymer can have a multimodal molecular weight distribution. Yet, in still other aspects, the olefin polymer can have a unimodal molecular weight distribution.

Polymerization Reactor Systems and Processes

The disclosed catalyst systems and methods of their preparation are intended for any olefin polymerization process using various types of polymerization reactors, polymerization reactor systems, and polymerization reaction conditions. As used herein, "polymerization reactor" includes any polymerization reactor capable of polymerizing olefin monomers and comonomers (one or more than one comonomer) to produce homopolymers, copolymers, terpolymers, and the like. The various types of polymerization reactors include, but are not limited to, those that can be referred to as a batch reactor, slurry reactor, gas-phase reactor, solution reactor, high pressure reactor, tubular reactor, autoclave reactor, and the like, or combinations thereof. Suitable polymerization conditions are used for the various reactor types. Gas phase reactors can comprise fluidized bed reactors or staged horizontal reactors. Slurry reactors can comprise vertical or horizontal loops. High pressure reactors can comprise autoclave reactors, tubular reactors, or combinations thereof, in parallel or in series. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (for example, 2 reactors, or more than 2 reactors) of the same or different type. For example, the polymerization reactor system can comprise a slurry reactor, a gas-phase reactor, a solution reactor, or a combination of two or more of these reactors. Production of polymers in multiple reactors can include several stages in at least two separate polymerization reactors interconnected by at least one transfer device, making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both.

According to one aspect, the polymerization reactor system can comprise at least one loop slurry reactor comprising vertical or horizontal loops. Monomer, diluent, catalyst, and comonomer can be continuously fed into a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608. Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327.

According to still another aspect, the polymerization reactor system can comprise a high pressure polymerization reactor, e.g., can comprise a tubular reactor and/or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously or pulsed).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from 60° C. to 280° C., for example, or from 60° C. to 120° C., depending upon the type of polymerization reactor. In some reactor systems, the polymerization temperature generally can be within a range from 65° C. to 110° C., from 70° C. to 100° C., or from 75° C. to 95° C.

Suitable pressures will also vary according to the reactor and polymerization type. The pressure for liquid phase polymerizations in a loop reactor typically can be less than 1000 psig. The pressure for gas phase polymerization can be in the 200 to 500 psig range. High pressure polymerization in tubular or autoclave reactors generally can be conducted at 20,000 to 75,000 psig. Polymerization reactors also can be operated in a supercritical region occurring at generally higher temperatures and pressures. Operation above the critical point of a pressure/temperature diagram (supercritical phase) can offer advantages to the polymerization reaction process.

Also encompassed herein are olefin polymerization processes utilizing any of the catalyst compositions described herein. One such process can comprise contacting a catalyst composition with an olefin monomer and optionally an olefin comonomer in a polymerization reactor system under polymerization conditions to produce an olefin polymer. Generally, the polymerization process can utilize any olefin monomer and optional comonomer disclosed herein, and the catalyst composition employed can be a single (or dual) metallocene catalyst system utilizing, for instance, any of the metallocene compounds, any of activator-supports, and any of the organoaluminum compounds disclosed herein, and the catalyst system can be prepared by any of the processes disclosed herein. This invention is also directed to, and encompasses, the polymers produced by any of the polymerization processes disclosed herein.

As another example, an olefin polymerization process encompassed herein can comprise (or consist essentially of, or consist of) contacting an alcohol compound and an organoaluminum compound for a first period of time to form a precontacted mixture, contacting the precontacted mixture with an activator-support and a metallocene compound for a second period of time to form a catalyst composition, and contacting the catalyst composition with an olefin monomer and optionally an olefin comonomer in a polymerization reactor system under polymerization conditions to produce an olefin polymer.

In a particular aspect, polymerization processes consistent with this invention can comprise contacting such catalyst compositions (e.g., as described herein or prepared as described herein) with ethylene and optionally an olefin comonomer in a polymerization reactor system under polymerization conditions to produce an ethylene polymer.

As described herein, the catalyst activities of these catalyst compositions, unexpectedly, can be greater than that of otherwise identical catalyst systems obtained without the use of the alcohol compound during catalyst preparation (under otherwise identical catalyst preparation conditions) or without the dialkyl aluminum alkoxide (and any alkyl aluminum dialkoxides and/or an aluminum trialkoxides, if present), when tested and compared under the same polymerization conditions. Thus, the disclosed olefin polymers processes (or catalyst compositions) can be characterized by an activity of the catalyst composition that is greater (e.g., by at least 10%, at least 20%, at least 25%, at least 30%, or at least 35%, and often up to and including 50%, 60%, 75%, or 100%) than that of an otherwise identical catalyst system obtained without the alcohol compound (or without the dialkyl aluminum alkoxide and without the alkyl aluminum dialkoxide and/or aluminum trialkoxide, if present), under the same catalyst preparation and polymerization conditions.

Examples

The invention is further illustrated by the following examples, which are not to be construed in any way as imposing limitations to the scope of this invention. Various other aspects, modifications, and equivalents thereof which, after reading the description herein, can suggest themselves to one of ordinary skill in the art without departing from the spirit of the present invention or the scope of the appended claims.

The activator-support (A-S) was prepared as follows. A slurry was made by mixing 400 mL of water and 100 g of silica-coated alumina (40 wt. % alumina, a surface area of 450 m²/g, a pore volume of 1.3 mL/g, and an average particle size of 35 microns). A solution of concentrated hydrofluoric acid (5 g HF) was mixed into the slurry, and the resulting slurry was then spray dried to a dry flowable powder. Calcining was performed at 600° C. by fluidizing the fluorided silica-coated alumina (4.75 wt. % fluoride) in dry nitrogen for 3 hr, followed by cooling to room temperature while still being fluidized under nitrogen.

The metallocene compound (MET) used in the examples was methyl(buten-3-yl)methylidene($\eta^5$-cyclopentadienyl)($\eta^5$-2,7-di-tert-butylfluoren-9-ylidene) zirconium dichloride. The organoaluminum compound (OA) was either tri-isobutylaluminum (TIBA) or triethylaluminum (TEA). The alcohol compound was either methanol (MeOH) or isopropanol (IPA).

Molecular weights and molecular weight distributions were obtained using a PL-GPC 220 (Polymer Labs, an Agilent® Company) system equipped with a IR4 detector (Polymer Char, Spain) and three (3) Styragel® HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were approximately 1 mg/mL, depending on the molecular weight. Sample preparation was conducted at 150° C. for nominally 4 hr with occasional and gentle agitation, before the solutions were transferred to sample vials for injection. An injection volume of about 400 µL was used. The integral calibration method was used to deduce molecular weights and molecular weight distributions using a broad Chevron Phillips Chemical Company's HDPE polyethylene resin, MARLEX® BHB5003, as the standard. The integral table of the standard was pre-determined in a separate experiment with SEC-MALS. Mn is the number-average molecular weight, Mw is the weight-average molecular weight, Mz is the z-average molecular weight, and Mp is the peak molecular weight (location, in molecular weight, of the highest point of the molecular weight distribution curve).

Melt rheological characterizations were performed as follows. Small-strain (10%) oscillatory shear measurements were performed on an Anton Paar® MCR 501 rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a (CY-a parameter). The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein: |η*(ω)|=magnitude of complex shear viscosity;
$\eta_0$=zero shear viscosity;
$\tau_\eta$=viscous relaxation time (Tau(η) in sec);
a="breadth" parameter (CY-a parameter);
n=fixes the final power law slope, fixed at 2/11; and
ω=angular frequency of oscillatory shearing deformation.

Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987).

Table I summarizes the catalyst compositions and polymerization experiments using a one-gallon stainless-steel autoclave reactor containing isobutane as the diluent. First, the reactor was charged at room temperature with the mixture of the organoaluminum compound (OA, 1M in hexanes) with the alcohol compound, which were mixed/reacted for a time period of from 30 sec to 5 min. Next, the activator-support (A-S, dry powder) was charged, followed by a toluene solution (1 mg/mL) of the metallocene compound (MET). The reactor was sealed and charged with 2 L of isobutane, and the reactor contents were heated to the target polymerization temperature of 80° C. with stirring (over a time period of ~5 min). When the reactor contents reached the target temperature, 1-hexene was added as the reactor was charged with ethylene to the target pressure (320 psig, 15 wt. % 1-hexene based on ethylene). No hydrogen was added. Ethylene and 1-hexene were fed on demand to maintain the target pressure. The reactor was maintained at the target temperature throughout the experiment by an automated heating-cooling system. After venting of the reactor, purging, and cooling, the resulting polymer product was dried under reduced pressure.

As shown in Table I, Examples A1-A9 used a precontacted mixture of TIBA and IPA during catalyst preparation, and Examples B1-B8 used a precontacted mixture of TIBA and MeOH during catalyst preparation—the molar ratio of OH:Al ranged from ~0.07:1 to 2:1. Examples C1-C3 were duplicate comparative examples using TIBA and no alcohol addition; the average catalyst activity of Examples C1-C3 was used for comparison to the examples in which an alcohol was used. Examples C4-C5 were comparative examples that used TIBA and either IPA or MeOH during catalyst preparation, but no activator-support. No polymer was produced in these experiments.

Likewise, Examples D1-D4 used a precontacted mixture of TEA and IPA during catalyst preparation, and Examples E1-E5 used a precontacted mixture of TEA and MeOH during catalyst preparation—the molar ratio of OH:Al ranged from −0.07:1 to 0.8:1. Examples C6-C7 were duplicate comparative examples using TEA and no alcohol addition; the average catalyst activity of Examples C6-C7 was used for comparison to the examples in which an alcohol was used.

Table I summarizes the catalyst activities for the examples based on the amount of the metallocene compound (g polymer per g MET per hr), and based on the amount of activator-support (g polymer per g A-S per hr). Molecular weight properties and rheological properties for the ethylene polymer produced in the examples also are summarized in Table I.

Unexpectedly, for the combination of TIBA and IPA at molar ratios of OH:Al of approximately 0.15:1 to 0.5:1, the increase in catalyst activity was 20-70%; for the combination of TIBA and MeOH at molar ratios of approximately 0.07:1 to 0.5:1, the increase in catalyst activity was 40-60%; for the combination of TEA and IPA at molar ratios of approximately 0.08:1 to 0.65:1, the increase in catalyst activity was 15-55%; and for the combination of TEA and MeOH at molar ratios of approximately 0.15:1 to 0.65:1, the increase in catalyst activity was 10-35%. Notably, at higher molar ratios of OH:Al, such as ~0.8:1 and above (and depending upon the particular combination of organoaluminum and alcohol compounds), the catalyst activity often decreased significantly.

For the examples noted above in which the catalyst activity increased from 10 to 70%, the molecular weight properties of the polymer produced were not significantly impacted. However, as compared to the respective comparative examples, the inventive examples showed slight decreases in molecular weight (Mn, Mw, and Mz). Likewise, and consistent with the lower molecular weight, there were increases in the high load melt index (HLMI, ASTM D1238 at 190° C. with a 21,600 gram weight) and decreases in the zero-shear viscosity of the inventive polymers. Surprisingly, the CY-a parameters for polymers of the inventive examples with catalytic activity increases of 10 to 70%, in relation to the respective comparative examples, increased an average of 6% for the combination of TIBA and IPA, an average of 15% for the combination of TIBA and MeOH, an average of 18% for the combination of TEA and IPA, and an average of 8% for the combination of TEA and MeOH.

TABLE I

Summary of Examples.

| Example | MET (mg) | A-S (mg) | OA Type | OA (mmol) | Alcohol Type | Alcohol (mmol) |
|---|---|---|---|---|---|---|
| C-1 | 1.0 | 150 | TIBA | 0.4 | — | 0 |
| C-2 | 1.0 | 150 | TIBA | 0.4 | — | 0 |
| C-3 | 1.0 | 150 | TIBA | 0.4 | — | 0 |
| C-4 | 1.0 | 0 | TIBA | 0.4 | IPA | 0.130 |
| C-5 | 1.0 | 0 | TIBA | 0.4 | MeOH | 0.154 |
| A-1 | 1.0 | 150 | TIBA | 0.4 | IPA | 0.033 |
| A-2 | 1.0 | 150 | TIBA | 0.4 | IPA | 0.065 |
| A-3 | 1.0 | 150 | TIBA | 0.4 | IPA | 0.130 |
| A-4 | 1.0 | 150 | TIBA | 0.4 | IPA | 0.130 |
| A-5 | 1.0 | 150 | TIBA | 0.4 | IPA | 0.195 |
| A-6 | 1.0 | 150 | TIBA | 0.4 | IPA | 0.260 |
| A-7 | 1.0 | 150 | TIBA | 0.4 | IPA | 0.326 |
| A-8 | 1.0 | 150 | TIBA | 0.4 | IPA | 0.391 |
| A-9 | 1.0 | 150 | TIBA | 0.4 | IPA | 0.781 |
| B-1 | 1.0 | 150 | TIBA | 0.4 | MeOH | 0.031 |
| B-2 | 1.0 | 150 | TIBA | 0.4 | MeOH | 0.062 |
| B-3 | 1.0 | 150 | TIBA | 0.4 | MeOH | 0.154 |
| B-4 | 1.0 | 150 | TIBA | 0.4 | MeOH | 0.185 |
| B-5 | 1.0 | 150 | TIBA | 0.4 | MeOH | 0.246 |
| B-6 | 1.0 | 150 | TIBA | 0.4 | MeOH | 0.246 |
| B-7 | 1.0 | 150 | TIBA | 0.4 | MeOH | 0.308 |
| B-8 | 1.0 | 150 | TIBA | 0.4 | MeOH | 0.308 |
| C-6 | 1.0 | 150 | TEA | 0.4 | — | 0 |
| C-7 | 1.0 | 150 | TEA | 0.4 | — | 0 |
| D-1 | 1.0 | 150 | TEA | 0.4 | IPA | 0.033 |
| D-2 | 1.0 | 150 | TEA | 0.4 | IPA | 0.195 |
| D-3 | 1.0 | 150 | TEA | 0.4 | IPA | 0.260 |
| D-4 | 1.0 | 150 | TEA | 0.4 | IPA | 0.326 |
| E-1 | 1.0 | 150 | TEA | 0.4 | MeOH | 0.031 |
| E-2 | 1.0 | 150 | TEA | 0.4 | MeOH | 0.062 |
| E-3 | 1.0 | 150 | TEA | 0.4 | MeOH | 0.185 |
| E-4 | 1.0 | 150 | TEA | 0.4 | MeOH | 0.246 |
| E-5 | 1.0 | 150 | TEA | 0.4 | MeOH | 0.308 |

| Example | OH/Al (molar) | Alcohol/MET (molar) | Alcohol/A-S (wt) | MET Activity (g/g/hr) | A-S Activity (g/g/hr) | Activity Increase (%) |
|---|---|---|---|---|---|---|
| C-1 | 0 | 0 | 0 | 480400 | 3203 | — |
| C-2 | 0 | 0 | 0 | 491600 | 3277 | — |
| C-3 | 0 | 0 | 0 | 520800 | 3472 | — |
| C-4 | 0.326 | 76 | — | 0 | 0 | — |
| C-5 | 0.385 | 90 | — | 0 | 0 | — |
| A-1 | 0.081 | 19 | 0.013 | 541400 | 3609 | 8.8 |
| A-2 | 0.163 | 38 | 0.026 | 600600 | 4004 | 20.7 |
| A-3 | 0.326 | 76 | 0.052 | 826333 | 5509 | 66.1 |
| A-4 | 0.326 | 76 | 0.052 | 814154 | 5428 | 63.6 |
| A-5 | 0.488 | 114 | 0.078 | 726231 | 4842 | 46.0 |
| A-6 | 0.651 | 152 | 0.104 | 537600 | 3584 | 8.0 |
| A-7 | 0.814 | 190 | 0.130 | 540600 | 3604 | 8.7 |
| A-8 | 0.976 | 228 | 0.156 | 413400 | 2756 | −16.9 |
| A-9 | 1.953 | 456 | 0.312 | 1000 | 7 | −99.8 |
| B-1 | 0.077 | 18 | 0.007 | 734160 | 4894 | 47.6 |
| B-2 | 0.154 | 36 | 0.013 | 715710 | 4771 | 43.8 |
| B-3 | 0.385 | 90 | 0.033 | 793714 | 5291 | 59.5 |
| B-4 | 0.462 | 108 | 0.039 | 742200 | 4948 | 49.2 |
| B-5 | 0.616 | 144 | 0.053 | 338600 | 2257 | −31.9 |
| B-6 | 0.616 | 144 | 0.053 | 326000 | 2173 | −34.5 |
| B-7 | 0.770 | 180 | 0.066 | 1000 | 7 | −99.8 |

TABLE I-continued

Summary of Examples.

| | | | | | | |
|---|---|---|---|---|---|---|
| B-8 | 0.770 | 180 | 0.066 | 1000 | 7 | −99.8 |
| C-6 | 0 | 0 | 0 | 416600 | 2777 | — |
| C-7 | 0 | 0 | 0 | 416200 | 2775 | — |
| D-1 | 0.081 | 19 | 0.013 | 480800 | 3205 | 15.5 |
| D-2 | 0.488 | 114 | 0.078 | 633000 | 4220 | 52.0 |
| D-3 | 0.651 | 152 | 0.104 | 530200 | 3535 | 27.3 |
| D-4 | 0.814 | 190 | 0.130 | 95600 | 637 | −77.0 |
| E-1 | 0.077 | 18 | 0.007 | 443800 | 2959 | 6.6 |
| E-2 | 0.154 | 36 | 0.013 | 556400 | 3709 | 33.6 |
| E-3 | 0.462 | 108 | 0.039 | 471800 | 3145 | 13.3 |
| E-4 | 0.616 | 144 | 0.053 | 477200 | 3181 | 14.6 |
| E-5 | 0.770 | 180 | 0.066 | 345400 | 2303 | −17.1 |

| Example | $M_n$ (kg/mol) | $M_w$ (kg/mol) | $M_z$ (kg/mol) | $M_w/M_n$ | $M_z/M_w$ |
|---|---|---|---|---|---|
| C-1 | 63.0 | 189 | 412 | 3.0 | 2.2 |
| C-2 | 72.5 | 195 | 401 | 2.7 | 2.1 |
| C-3 | 70.5 | 184 | 392 | 2.6 | 2.1 |
| C-4 | — | — | — | — | — |
| C-5 | — | — | — | — | — |
| A-1 | 64.6 | 181 | 376 | 2.8 | 2.1 |
| A-2 | 66.1 | 180 | 372 | 2.7 | 2.1 |
| A-3 | 62.6 | 161 | 326 | 2.6 | 2.0 |
| A-4 | 61.9 | 170 | 343 | 2.7 | 2.0 |
| A-5 | 72.4 | 170 | 323 | 2.3 | 1.9 |
| A-6 | 69.8 | 189 | 394 | 2.7 | 2.1 |
| A-7 | 72.9 | 190 | 368 | 2.6 | 1.9 |
| A-8 | 87.2 | 208 | 389 | 2.4 | 1.9 |
| A-9 | — | — | — | — | — |
| B-1 | 68.1 | 173 | 347 | 2.5 | 2.0 |
| B-2 | — | — | — | — | — |
| B-3 | 61.8 | 163 | 348 | 2.6 | 2.1 |
| B-4 | 63.0 | 167 | 354 | 2.7 | 2.1 |
| B-5 | 89.6 | 220 | 426 | 2.5 | 1.9 |
| B-6 | 89.8 | 227 | 430 | 2.5 | 1.9 |
| B-7 | — | — | — | — | — |
| B-8 | — | — | — | — | — |
| C-6 | 80.7 | 213 | 413 | 2.6 | 1.9 |
| C-7 | 83.7 | 215 | 412 | 2.6 | 1.9 |
| D-1 | 62.5 | 193 | 380 | 3.1 | 2.0 |
| D-2 | 58.1 | 182 | 367 | 3.1 | 2.0 |
| D-3 | 81.0 | 204 | 405 | 2.5 | 2.0 |
| D-4 | 138.6 | 311 | 566 | 2.2 | 1.8 |
| E-1 | 84.6 | 202 | 383 | 2.4 | 1.9 |
| E-2 | 83.1 | 195 | 374 | 2.4 | 1.9 |
| E-3 | 81.7 | 196 | 373 | 2.4 | 1.9 |
| E-4 | 80.2 | 194 | 369 | 2.4 | 1.9 |
| E-5 | — | — | — | — | — |

| Example | HLMI (g/10 min) | Zero Shear ($\eta_0$, Pa-sec) | CY-a |
|---|---|---|---|
| C-1 | 3.7 | 5.59E+04 | 0.348 |
| C-2 | 3.4 | 5.04E+04 | 0.375 |
| C-3 | 4.3 | 4.19E+04 | 0.365 |
| C-4 | — | — | — |
| C-5 | — | — | — |
| A-1 | 4.3 | 3.64E+04 | 0.380 |
| A-2 | 4.7 | 3.68E+04 | 0.375 |
| A-3 | 7.3 | 2.39E+04 | 0.375 |
| A-4 | 2.3 | 3.12E+04 | 0.373 |
| A-5 | 6.0 | 2.50E+04 | 0.423 |
| A-6 | 4.3 | 3.96E+04 | 0.397 |
| A-7 | 3.4 | 4.03E+04 | 0.434 |
| A-8 | 2.5 | 4.92E+04 | 0.459 |
| A-9 | — | — | — |
| B-1 | 5.7 | 2.82E+04 | 0.400 |
| B-2 | — | — | — |
| B-3 | 7.9 | 1.87E+04 | 0.433 |
| B-4 | 6.8 | 2.32E+04 | 0.416 |
| B-5 | 1.9 | 7.83E+04 | 0.416 |
| B-6 | 2.6 | 7.60E+04 | 0.432 |
| B-7 | — | — | — |
| B-8 | — | — | — |
| C-6 | 2.3 | 7.17E+04 | 0.376 |
| C-7 | 3.5 | 8.57E+04 | 0.363 |
| D-1 | 3.1 | 4.94E+04 | 0.404 |

TABLE I-continued

Summary of Examples.

| | | | |
|---|---|---|---|
| D-2 | 4.2 | 4.87E+04 | 0.405 |
| D-3 | 2.9 | 3.06E+05 | 0.498 |
| D-4 | 0.0 | 3.46E+04 | 0.407 |
| E-1 | 2.6 | 6.29E+04 | 0.388 |
| E-2 | 3.4 | 4.55E+04 | 0.402 |
| E-3 | 3.4 | 4.91E+04 | 0.409 |
| E-4 | 3.0 | 4.81E+04 | 0.392 |
| E-5 | 1.4 | — | — |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A process to produce a catalyst composition, the process comprising:

(i) contacting an alcohol compound and an organoaluminum compound for a first period of time to form a precontacted mixture; and (ii) contacting the precontacted mixture with an activator-support and a metallocene compound for a second period of time to form the catalyst composition.

Aspect 2. The process defined in aspect 1, wherein the precontacted mixture is contacted with the activator-support before the metallocene compound.

Aspect 3. The process defined in aspect 1, wherein the precontacted mixture is contacted with the metallocene compound before the activator-support.

Aspect 4. The process defined in any one of aspects 1-3, wherein the organoaluminum compound is present as a solution in any suitable hydrocarbon solvent.

Aspect 5. The process defined in any one of aspects 1-4, wherein the metallocene compound is present as a solution in any suitable hydrocarbon solvent.

Aspect 6. The process defined in any one of aspects 1-5, wherein the activator-support compound is present as a slurry in any suitable hydrocarbon solvent.

Aspect 7. The process defined in any one of aspects 4-6, wherein the hydrocarbon solvent comprises cyclohexane, cyclohexene, isobutane, n-butane, n-pentane, isopentane, neopentane, hexane, 1-hexene, heptane, toluene, or combinations thereof.

Aspect 8. The process defined in any one of aspects 1-5, wherein the activator-support is introduced as a dry solid.

Aspect 9. The process defined in any one of aspects 1-8, wherein a molar ratio of hydroxyl (—OH) groups of the alcohol compound to aluminum of the organoaluminum compound (OH:Al) is in any suitable range, e.g., from 0.05:1 to 0.9:1, from 0.05:1 to 0.7:1, from 0.05:1 to 0.5:1, 0.07:1 to 0.65:1, from 0.1:1 to 0.8:1, from 0.1:1 to 0.7:1, or from 0.2:1 to 0.6:1.

Aspect 10. The process defined in any one of aspects 1-9, wherein a molar ratio of the alcohol compound to the metallocene compound is in any suitable range, e.g., from 1:1 to 1000:1, from 10:1 to 500:1, or from 100:1 to 400:1.

Aspect 11. The process defined in any one of aspects 1-10, wherein a weight ratio of the alcohol compound to the activator-support is in any suitable range, e.g., from 1:1 to 1:500, from 1:2 to 1:250, or from 1:5 to 1:150.

Aspect 12. The process defined in any one of aspects 1-11, wherein the first period of time is any time period sufficient to form the precontacted mixture, e.g., from 1 sec to 15 sec, from 1 sec to 10 min, from 1 sec to 48 hr, from 10 sec to 12 hr, from 30 sec to 6 hr, from 30 sec to 5 min, at least 5 sec, at least 15 sec, or at least 1 min.

Aspect 13. The process defined in any one of aspects 1-12, wherein the second period of time is any time period sufficient to form the catalyst composition, e.g., from 1 sec to 15 sec, from 1 sec to 10 min, from 1 sec to 48 hr, from 10 sec to 12 hr, from 30 sec to 6 hr, from 30 sec to 5 min, at least 5 sec, at least 15 sec, or at least 1 min.

Aspect 14. The catalyst composition produced by the process defined in any one of the preceding aspects.

Aspect 15. A catalyst composition comprising (A) an activator-support, (B) a metallocene compound, (C) an organoaluminum compound, and (D) a dialkyl aluminum alkoxide (and optionally, an alkyl aluminum dialkoxide and/or an aluminum trialkoxide), Aspect 16. The process or composition defined in any one of aspects 1-15, wherein an activity of the catalyst composition is greater (by any amount disclosed herein, e.g., at least 10%, at least 15%, at least 20%, at least 30%, or at least 35%, up to 50%, 60%, 75%, or 100%) than that of an otherwise identical catalyst system obtained without the alcohol compound (or without the dialkyl aluminum alkoxide and without the alkyl aluminum dialkoxide and/or aluminum trialkoxide, if present), under the same catalyst preparation and polymerization conditions.

Aspect 17. The process or composition defined in any one of aspects 1-16, wherein a weight ratio of the metallocene compound to the activator-support is in any suitable range, e.g., from 1:1 to 1:1,000,000, from 1:10 to 1:10,000, or from 1:20 to 1:1000.

Aspect 18. The process or composition defined in any one of aspects 1-17, wherein a weight ratio of the activator-support to the organoaluminum compound is in any suitable range, e.g., from 1:1 to 100:1, from 1:1 to 50:1, or from 2:1 to 20:1.

Aspect 19. The process or composition defined in any one of aspects 1-18, wherein the activator-support comprises a solid oxide treated with an electron-withdrawing anion.

Aspect 20. The process or composition defined in any one of aspects 1-19, wherein the activator-support comprises a fluorided solid oxide, a sulfated solid oxide, a phosphated solid oxide, or a combination thereof.

Aspect 21. The process or composition defined in any one of aspects 1-19, wherein the activator-support comprises fluorided alumina, chlorided alumina, bromided alumina, sulfated alumina, phosphated alumina, fluorided silica-alumina, chlorided silica-alumina, bromided silica-alumina, sulfated silica-alumina, phosphated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, or any combination thereof.

Aspect 22. The process or composition defined in any one of aspects 1-21, wherein the organoaluminum compound comprises any organoaluminum compound disclosed herein.

Aspect 23. The process or composition defined in any one of aspects 1-22, wherein the organoaluminum compound comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum chloride, or any combination thereof.

Aspect 24. The process or composition defined in aspect 22 or 23, wherein the organoaluminum compound comprises triethylaluminum.

Aspect 25. The process or composition defined in aspect 22 or 23, wherein the organoaluminum compound comprises triisobutylaluminum.

Aspect 26. The process or composition defined in any one of aspects 1-25, wherein the catalyst composition is substantially free of aluminoxane compounds, organoboron or organoborate compounds, ionizing ionic compounds, or combinations thereof.

Aspect 27. The process or composition defined in any one of aspects 1-26, wherein the alcohol compound comprises any alcohol compound disclosed herein. e.g., a mono-ol, a diol, a triol, or a polyol, as well as combinations thereof.

Aspect 28. The process or composition defined in any one of aspects 1-27, wherein the alcohol compound comprises a hydrocarbyl alcohol, e.g., an alkyl alcohol, a cycloalkyl alcohol, an aryl alcohol, or an arylalkyl alcohol, as well as combinations thereof.

Aspect 29. The process or composition defined in any one of aspects 1-28, wherein the alcohol compound comprises a $C_1$ to $C_{32}$ alcohol, e.g., a $C_1$ to $C_{18}$ alcohol, a $C_1$ to $C_8$ alcohol, or a $C_1$ to $C_4$ alcohol.

Aspect 30. The process or composition defined in any one of aspects 1-29, wherein the alcohol compound comprises any mono-ol disclosed herein, e.g., methanol, ethanol, propanol (e.g., isopropanol, n-propanol), butanol (e.g., n-butanol, isobutanol), pentanol, hexanol, heptanol, octanol, decanol, hexadecanol, cyclohexanol, phenol, or benzyl alcohol, as well as combinations thereof.

Aspect 31. The process or composition defined in any one of aspects 1-30, wherein the metallocene compound comprises a bridged metallocene compound, e.g., any bridged metallocene compound disclosed herein.

Aspect 32. The process or composition defined in any one of aspects 1-31, wherein the metallocene compound comprises an unbridged metallocene compound, e.g., any unbridged metallocene compound disclosed herein.

Aspect 33. The process or composition defined in any one of aspects 1-32, wherein the catalyst composition comprises a single metallocene compound, two metallocene compounds, or more than two metallocene compounds.

Aspect 34. An olefin polymerization process, the process comprising contacting the catalyst composition defined in any one of aspects 1-33 with an olefin monomer and an optional olefin comonomer in a polymerization reactor system under polymerization conditions to produce an olefin polymer.

Aspect 35. The process defined in aspect 34, wherein the olefin monomer comprises any olefin monomer disclosed herein, e.g., any $C_2$-$C_{20}$ olefin.

Aspect 36. The process defined in aspect 34, wherein the olefin monomer and the optional olefin comonomer independently comprise a $C_2$-$C_{20}$ alpha-olefin.

Aspect 37. The process defined in any one of aspects 34-36, wherein the olefin monomer comprises ethylene.

Aspect 38. The process defined in any one of aspects 34-37, wherein the catalyst composition is contacted with ethylene and an olefin comonomer comprising a $C_3$-$C_{10}$ alpha-olefin.

Aspect 39. The process defined in any one of aspects 34-38, wherein the catalyst composition is contacted with ethylene and an olefin comonomer comprising 1-butene, 1-hexene, 1-octene, or a mixture thereof.

Aspect 40. The process defined in any one of aspects 34-39, wherein the polymerization reactor system comprises a batch reactor, a slurry reactor, a gas-phase reactor, a solution reactor, a high pressure reactor, a tubular reactor, an autoclave reactor, or a combination thereof.

Aspect 41. The process defined in any one of aspects 34-40, wherein the polymerization reactor system comprises a slurry reactor, a gas-phase reactor, a solution reactor, or a combination thereof.

Aspect 42. The process defined in any one of aspects 34-41, wherein the polymerization reactor system comprises a loop slurry reactor.

Aspect 43. The process defined in any one of aspects 34-42, wherein the polymerization reactor system comprises a single reactor.

Aspect 44. The process defined in any one of aspects 34-42, wherein the polymerization reactor system comprises two reactors.

Aspect 45. The process defined in any one of aspects 34-42, wherein the polymerization reactor system comprises more than two reactors.

Aspect 46. The process defined in any one of aspects 34-45, wherein the olefin polymer comprises any olefin polymer disclosed herein.

Aspect 47. The process defined in any one of aspects 34-46, wherein the olefin polymer comprises an ethylene homopolymer, an ethylene/1-butene copolymer, an ethylene/1-hexene copolymer, and/or an ethylene/1-octene copolymer.

Aspect 48. The process defined in any one of aspects 34-47, wherein the olefin polymer comprises an ethylene/1-hexene copolymer.

Aspect 49. The process defined in any one of aspects 34-48, wherein the polymerization conditions comprise a polymerization temperature in a range from 60° C. to 120° C., from 65° C. to 110° C., from 70° C. to 100° C., or from 75° C. to 95° C.

Aspect 50. The process defined in any one of aspects 34-49, wherein an activity of the catalyst composition is greater (by any amount disclosed herein, e.g., at least 10%, at least 20%, at least 25%, at least 30%, or at least 35%, up to 50%, 60%, 75%, or 100%) than that of an otherwise identical catalyst system obtained without the alcohol compound (or without the dialkyl aluminum alkoxide and without the alkyl aluminum dialkoxide and/or aluminum trialkoxide, if present), under the same catalyst preparation and polymerization conditions.

Aspect 51. The olefin polymer produced by the olefin polymerization process defined in any one of aspects 34-50.

We claim:

1. A catalyst composition comprising:
   (A) an activator-support;
   (B) a metallocene compound;
   (C) a trialkylaluminum compound;
   (D) a dialkyl aluminum alkoxide; and
   (E) an alkyl aluminum dialkoxide and/or an aluminum trialkoxide.

2. The composition of claim 1, wherein an activity of the catalyst composition is greater than that of an otherwise identical catalyst system without the dialkyl aluminum alkoxide, under the same catalyst preparation and polymerization conditions.

3. The composition of claim 1, wherein an activity of the catalyst composition is greater than an activity of an otherwise identical catalyst system without the dialkyl aluminum alkoxide and the alkyl aluminum dialkoxide and/or aluminum trialkoxide, under the same catalyst preparation and polymerization conditions.

4. The composition of claim 1, wherein:
   a weight ratio of the metallocene compound to the activator-support is in a range from 1:10 to 1:10,000;
   a weight ratio of the activator-support to the trialkylaluminum compound is in a range from 1:1 to 100:1; and
   the catalyst composition is substantially free of aluminoxane compounds, organoboron or organoborate compounds, ionizing ionic compounds, or combinations thereof.

5. The composition of claim 1, wherein:
   the trialkylaluminum compound comprises trimethylaluminum, triethylaluminum, tri-n-propylaluminum, tri-n-butylaluminum, triisobutylaluminum, tri-n-hexylaluminum, tri-n-octylaluminum, or any combination thereof; and
   the activator-support comprises a fluorided solid oxide, a sulfated solid oxide, a phosphated solid oxide, or any combination thereof.

6. An olefin polymerization process, the olefin polymerization process comprising contacting the catalyst composition of claim 1 with an olefin monomer and an optional olefin comonomer in a polymerization reactor system under polymerization conditions to produce an olefin polymer.

7. The olefin polymerization process of claim 6, wherein:
   the activator-support comprises fluorided silica-alumina, fluorided silica-coated alumina, fluorided-chlorided silica-coated alumina, sulfated alumina, phosphated alumina, or a combination thereof;
   the polymerization reactor system comprises a slurry reactor, a gas-phase reactor, a solution reactor, or a combination thereof; and
   the olefin monomer comprises ethylene and the olefin comonomer comprises 1-butene, 1-hexene, 1-octene, or a mixture thereof.

8. The olefin polymerization process of claim 7, wherein an activity of the catalyst composition is greater than that of an otherwise identical catalyst system without the dialkyl aluminum alkoxide, under the same catalyst preparation and polymerization conditions.

9. The olefin polymerization process of claim 6, wherein:
   the polymerization conditions comprise a polymerization temperature in a range from 60° C. to 120° C.;
   the polymerization reactor system comprises a loop slurry reactor; and
   the olefin polymer comprises an ethylene homopolymer, an ethylene/1-butene copolymer, an ethylene/1-hexene copolymer, and/or an ethylene/1-octene copolymer.

10. The process of claim 6, wherein:
    the activator-support comprises a fluorided solid oxide, a sulfated solid oxide, a phosphated solid oxide, or any combination thereof.

11. The process of claim 10, wherein the metallocene compound comprises a bridged metallocene compound.

12. The process of claim 10, wherein the metallocene compound comprises an unbridged metallocene compound.

13. The composition of claim 1, wherein the activator-support comprises fluorided silica-alumina, fluorided silica-coated alumina, fluorided-chlorided silica-coated alumina, sulfated alumina, phosphated alumina, or a combination thereof.

14. The composition of claim 13, wherein the catalyst composition is substantially free of aluminoxane compounds, organoboron or organoborate compounds, ionizing ionic compounds, or combinations thereof.

15. The composition of claim 1, wherein the metallocene compound comprises a bridged metallocene compound.

16. The composition of claim 1, wherein the metallocene compound comprises an unbridged metallocene compound.

17. The composition of claim 1, wherein the metallocene compound comprises two metallocene compounds.

18. The composition of claim 1, wherein the catalyst composition comprises the alkyl aluminum dialkoxide.

19. The composition of claim 1, wherein the catalyst composition comprises the aluminum trialkoxide.

20. The composition of claim 5, wherein the catalyst composition comprises the alkyl aluminum dialkoxide.

21. The composition of claim 5, wherein the catalyst composition comprises the aluminum trialkoxide.

22. The composition of claim 13, wherein the catalyst composition comprises the alkyl aluminum dialkoxide.

23. The composition of claim 13, wherein the catalyst composition comprises the aluminum trialkoxide.

* * * * *